(12) United States Patent
Manni et al.

(10) Patent No.: US 6,975,294 B2
(45) Date of Patent: Dec. 13, 2005

(54) SYSTEMS AND METHODS FOR SPECKLE REDUCTION THROUGH BANDWIDTH ENHANCEMENT

(75) Inventors: Jeffrey Glenn Manni, Burlington, MA (US); Robert J. Martinsen, Amesbury, MA (US)

(73) Assignee: Corporation for Laser Optics Research, Portsmouth, NH (US)

( * ) Notice: Subject to any disclaimer, the term of this patent is extended or adjusted under 35 U.S.C. 154(b) by 912 days.

(21) Appl. No.: 09/902,453

(22) Filed: Jul. 10, 2001

(65) Prior Publication Data

US 2002/0196414 A1  Dec. 26, 2002

Related U.S. Application Data

(60) Provisional application No. 60/217,131, filed on Jul. 10, 2000.

(51) Int. Cl.[7] ............................................... G09G 3/32
(52) U.S. Cl. ........................... 345/83; 345/32; 353/31; 353/94; 372/23
(58) Field of Search ................................ 372/9, 20, 23; 353/31, 91; 345/31, 32, 82, 83; 359/237, 359/618; 362/227, 231, 234, 253, 259

(56) References Cited

U.S. PATENT DOCUMENTS

| | | | |
|---|---|---|---|
| 4,599,730 A * | 7/1986 | Eden et al. ............... | 372/57 |
| 4,603,421 A | 7/1986 | Scifres et al. | |
| 5,715,021 A * | 2/1998 | Gibeau et al. ............. | 348/750 |
| 5,774,487 A | 6/1998 | Morgan | |
| 5,990,983 A | 11/1999 | Hargis et al. | |
| 6,011,643 A | 1/2000 | Wunderlich et al. | |
| 6,154,259 A * | 11/2000 | Hargis et al. ............. | 348/756 |
| 6,283,597 B1 * | 9/2001 | Jorke .......................... | 353/31 |
| 6,304,237 B1 * | 10/2001 | Karakawa ................... | 345/84 |
| 6,590,698 B1 * | 7/2003 | Ohtsuki et al. ............ | 359/326 |

FOREIGN PATENT DOCUMENTS

| | | |
|---|---|---|
| EP | 0603826 | 6/1994 |
| WO | WO 95/20811 | 8/1995 |

* cited by examiner

*Primary Examiner*—Alexander Eisen
*Assistant Examiner*—Robin Mak
(74) *Attorney, Agent, or Firm*—Fish & Neave IP Group Ropes & Gray LLP

(57) ABSTRACT

A laser imaging system with reduced speckle is disclosed. The laser imaging system includes spatially superpositioned 1-D arrays or alternatively 2-D arrays of independent emitters of laser radiation, with each emitter having a spectral bandwidth $\Delta\lambda_i$ centered at some arbitrary wavelength $\lambda_{0i}$. The elements of the array are allowed, by design, to have a slightly different central wavelength, thereby creating an ensemble bandwidth $\Delta\Lambda$ which is much greater than the bandwidth $\Delta\lambda_i$ of any individual emitter in the array. The resulting increased bandwidth reduces speckle in a displayed image.

16 Claims, 5 Drawing Sheets

SYSTEMS AND METHODS FOR SPECKLE REDUCTION THROUGH BANDWIDTH ENHANCEMENT

CROSS-REFERENCE TO OTHER PATENT APPLICATIONS

This application claims the benefit of U.S. provisional application No. 60/217,131, filed Jul. 10, 2000, which is incorporated herein by reference.

FIELD OF THE INVENTION

This invention relates to a laser light source for image projectors. More specifically, it relates to bandwidth-enhanced laser sources for projection imaging applications with reduced speckle.

BACKGROUND OF THE INVENTION

Red, green and blue (RGB) lasers offer demonstrable benefits over incandescent light sources for high-performance imaging applications. Greater color saturation, contrast, sharpness, and color-gamut are among the most compelling attributes distinguishing laser displays from conventional imaging systems employing arc lamps. In spite of these performance advantages, however, market acceptance of laser display technology remains hindered as a result of its higher cost, lower reliability, larger package size and greater power consumption when compared to an equivalent lumen output lamp-driven display.

To compare laser projection technology with conventional technologies, it is instructive to examine two fundamental parameters which relate to their ultimate practicality. The first parameter can be defined as optical efficiency—in this case, the lumens of output per watt of input to the light source. The second is cost compatibility, that is, the extent to which the technology in question yields a cost effective solution to the requirements of a specific application.

Based on these parameters, a red/green/blue (RGB) semiconductor/microlaser system, consisting of three lasers or laser arrays, each operating at a fundamental color, appears to be the most efficient, high brightness, white light projection source for display applications to date. Semiconductor laser operation has been achieved from the UV to the IR range of the spectrum, using device structures based on InGaAlN, InGaAlP and InGaAlAs material systems. Desirable center wavelength ranges are 610–635 nm for red, 525–540 nm for green, and 445–470 nm for blue, as discussed below. An optical source with this spectrum provides a greater color gamut than a conventional arc lamp approach and projection technology which uses blackbody radiation.

Laser radiation is inherently narrow band and gives rise to the perception of fully-saturated colors. Unfortunately, narrow band light incident on random rough surfaces (such as a projection screen) also introduces an unacceptable image artifact known as "speckle". The visual effects of speckle detract from the aesthetic quality of an image and also result in a reduction of image resolution. Consequently, in the context of high resolution display systems, it is generally deemed essential that speckle be eliminated. A variety of "de-speckling" techniques can be used to reduce this artifact to "acceptable levels", but only at the expense of a further loss in efficiency, which negatively impacts cost, reliability, package size, and power consumption.

Known speckle reduction techniques tend to disturb the spatial or temporal coherence of laser beams through optical path randomization and/or spectral broadening. However, most of these solutions are expensive and technically complex, relying, for example, on mode-locking techniques to produce very short pulses in the order of 1 ps to increase the optical bandwidth. Ideally, the spectral bandwidth for a projection display light source should be on the order of several nanometers (i.e., 5–15 nm). Such a light source could be considered quasi-monochromatic—sufficiently broadband for the cancellation of speckle yet sufficiently narrow band for color purity. There is simply no laser-based RGB light source in existence with these properties.

It would therefore be desirable to provide a laser-based RGB light source with a spectral width of approximately 5–15 nm at the fundamental RGB wavelengths (approximately 620 nm for red, 530 for green, and 460 nm for blue), that is compact, efficient, reliable and inexpensive to manufacture. The practical purpose of the RGB laser-based light source is to achieve a high brightness (>1000 lumens) projection display on a screen of approximately 7.5 feet diagonal with a reduction in speckle. The demand for an RGB laser light source having several nanometers of bandwidth is universal for the vast majority of projectors (i.e., LCoS, p-Si LCD, DLP, and possibly GLV).

SUMMARY OF THE INVENTION

The invention is directed to a laser projection display system which uses, depending on the desired wavelength, semiconductor diode laser arrays, diode-pumped microlasers and/or nonlinear frequency conversion of such lasers.

According to one aspect of the invention, a bandwidth-enhanced laser imaging system includes a plurality of lasing elements, with each lasing element emitting a laser beam with a center wavelength $\lambda_{0i}$ and a spectral bandwidth $\lambda_{0i}$. The lasing elements are allowed, by design, to have a slightly different center wavelength $\lambda_i$ thereby creating an ensemble bandwidth $\Delta\Lambda$ which is greater than the bandwidth $\Delta\lambda_i$ of any individual emitter in the array. Imaging optics combines the respective laser beams. The combined laser beams have an ensemble spectrum $\Lambda$ with an overlap parameter $\gamma = \overline{\Delta\lambda_i}/\overline{S_i} \geq 1$, wherein $\overline{\Delta\lambda_i}$ is a mean spectral bandwidth of the lasing elements and $\overline{S_i}$ is a mean wavelength shift between respective center wavelengths $\lambda_{0i}$ of spectrally adjacent lasing elements.

According to another aspect of the invention, a bandwidth-enhanced RGB laser projection system with reduced speckle includes three illuminators associated with a respective R, G and B channel and producing R, G and B illumination. A beam combiner combines the R, G and B illumination, and projection optics projects the combined R, G and B illumination on a projection display screen. At least one of the R, G, and B illuminators includes a plurality of lasing elements, with each lasing element emitting a laser beam with a center wavelength $\lambda_{0i}$ and a spectral bandwidth $\Delta\lambda_i$. The lasing elements are allowed, by design, to have a slightly different center wavelength $\lambda_{0i}$, thereby creating an ensemble bandwidth $\Delta\Lambda$ which is greater than the bandwidth $\Delta\lambda_i$ of any individual emitter in the array. A beam homogenizer images the laser beams of the plurality of lasing elements on a common imaging surface. The imaged laser beams have an ensemble spectrum $\Lambda$ with an overlap parameter $\gamma = \overline{\Delta\lambda_i}/\overline{S_i} \geq 1$, wherein $\overline{\Delta\lambda_i}$ is a mean spectral bandwidth of the lasing elements and $\overline{S_i}$ is a mean wavelength shift between respective center wavelengths $\lambda_{0i}$.

According to yet another aspect of the invention, a method is provided for producing bandwidth-enhanced laser radiation. The method includes the acts of producing a plurality of laser beams, each laser beam having a center wavelength $\lambda_{0i}$ and a spectral bandwidth $\Delta\lambda_i$, wherein the center wavelength of at least one of the laser beams is wavelength-shifted with respect to the center wavelength of at least one other laser beam, and combining the respective laser beams into a spatially overlapping beam. The spatially overlapping beam has an ensemble spectrum $\Lambda$ with an overlap parameter $\gamma = \overline{\Delta\lambda_I}/\overline{S_I}$, with $\overline{\Delta\lambda_I}$ being a mean spectral bandwidth of the laser beams and $\overline{S_I}$ being a mean wavelength shift between the center wavelengths $\lambda_{0i}$ of the at least one and the at least one other laser beams, with $\overline{\Delta\lambda_I}$ and $\overline{S_I}$ of the array being selected so that $\gamma \geq 1$. The value of $\gamma$ is selected so as to reduce speckle in the projected laser image.

Embodiments of the invention may include one or more of the following features. The system may include a modulator that is illuminated with the combined laser beams and receives image control signals to form a projected laser image. The lasing elements can include semiconductor lasers that are arranged in a common emission plane, for example, forming a two-dimensional array. The lasing elements can emit R, G, B visible light or UV or IR optical radiation. In the latter case, the system may also include an optical frequency converter, such as bulk crystals or waveguides that are phase matched or quasi-phase matched (QPM) and pumped by the lasing elements. Alternative light sources may also include arrays of diode-pumped solid state and fiber lasers. The ensemble spectrum $\Lambda$ can have an ensemble bandwidth $\Delta\Lambda$ between 1 nm and 10 nm.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

The invention is directed to a bandwidth-enhanced laser light source for image projectors. In particular, the laser light source described herein can reduce speckle in projection imaging applications.

Figure 1:
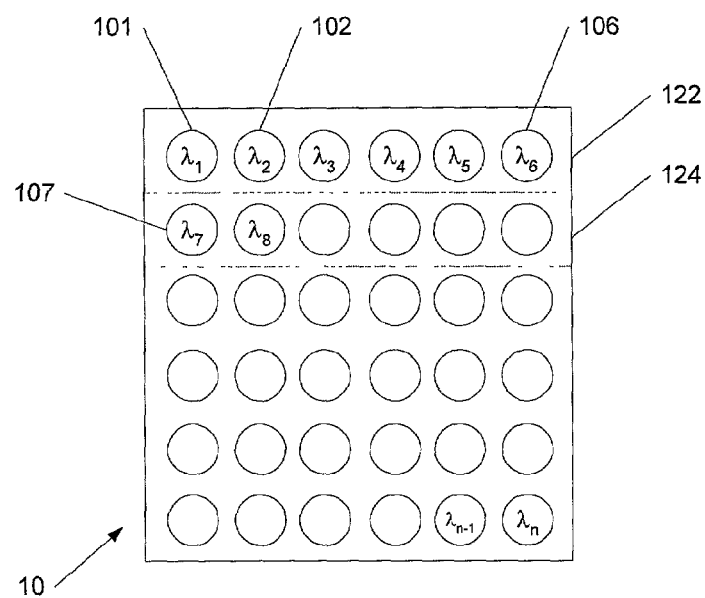
FIG. 1 is a top view of an exemplary bandwidth-enhanced laser light source with n lasing elements.

Referring now to FIG. 1, bandwidth-enhanced laser light is produced from a two-dimensional (2-D) array 10 of spatially separated, discrete emitters of laser radiation 101, 102, . . . , wherein each emitter 101, 102, . . . has a respective spectral bandwidth $\Delta\lambda_i$ centered at some arbitrary red, green or blue wavelength $\lambda_{0i}$. The elements of the array are designed to have slightly different central wavelengths, thereby creating an ensemble bandwidth $\Delta\Lambda$ which is greater than the bandwidth $\Delta\lambda_i$ of any individual emitter in the array. By engineering precisely the amount of ensemble bandwidth $\Delta\Lambda$ required for the cancellation of speckle, the quasi-monochromatic property responsible for the appearance of fully-saturated color is preserved. Laser radiation in the wavelength range of interest for RGB projection displays can be produced in a number of ways known in the art. For example, high-power semiconductor diode lasers that directly generate red, green, and blue wavelengths suitable for projection display applications may become available in the near future. Diode lasers that emit in the blue and green spectral range can be made from AlGaInN alloys, whereas diode lasers that emit in the red spectral range can be made from AlGaInAsP. The emission wavelengths of these lasers is mainly determined by the material composition of the active layer. For example, the wavelength of GaAlInN lasers can be varied between UV and green by selecting the Ga:Al:In ratio of the material. Likewise, the wavelength of GaAlInAsP lasers can be varied between orange and IR by selecting the respective Ga:Al:In and As:P ratios. Rapid progress has been made over the past couple of years to increase both the optical output power and the lifetime of these laser devices, so that semiconductor lasers elements will most likely emerge as the light-emitting device of choice for image projection applications.

Until powerful semiconductor diode lasers emitting in the visible spectral range become available, in an alternative embodiment, 1-D and/or 2-D arrays of near-infrared semiconductor diode lasers can frequency-doubled to produce red, green, and blue laser emission. Due to their high beam quality, vertical cavity surface emitting lasers (VCSEL) can be employed as pump sources for pumping a non-linear crystal or waveguide. The non-linear crystal or waveguide can be in crystal form (bulk) or in form of a quasi-phase matched (QPM) frequency converter for visible light generation. Still other light sources may include arrays of diode-pumped solid state and fiber lasers, but the size, complexity, and cost of such devices tend to make them less attractive for practical applications.

Visible light can be produced from IR-pumped gain media in several ways known in the art. If a common laser gain medium is used for the construction of an array, and if the gain medium has a wide-enough gain bandwidth, then the individual lasers can be "tuned" so that the array's ensemble bandwidth $\Delta\Lambda$ is substantially larger than the bandwidth $\Delta\lambda_i$ of any one laser.

Even without intentional "tuning", an array of end-pumped lasers may already exhibit an ensemble bandwidth $\Delta\Lambda$ that is somewhat larger than that of the individual lasers. The bandwidth spread may be enhanced, for example, by establishing a temperature gradient across the array of gain elements. This could shift the peak of the net-gain curve for each element, and hence the peak of the laser emission, relative to the others. This effect would be enhanced by a temperature-dependent loss mechanism occurring in the lasing process, such as up-conversion.

In another approach, a tuning element, for example, an etalon, with a peak transmission that is slightly different for each laser in the array could be provided. The tuning element would force oscillation at a wavelength within the gain bandwidth of the laser material that does not necessarily coincide with the peak of the gain curve. Discrete tuning elements (etalons) might be introduced into each resonator separately, or a single "macro"-tuning element might operate on all resonators simultaneously. For example, a single "macro-etalon", with a continuously varying thickness along its width, might operate on all lasers simultaneously. Alternatively, a temperature gradient might be established across the macro-etalon as a way to "chirp" the etalon's peak transmission wavelength versus distance.

Alternatively, a periodically-poled (PP) nonlinear material with a "chirped" grating period, or with multiple regions that have slightly different grating periods, could be inserted into the resonators. Visible light emission using PP nonlinear materials began to attract serious attention approximately a decade ago. Crystals that cannot be phase-matched because of the lack of adequate birefringence to offset dispersion can be phase-matched by modulating the sign of the nonlinear coefficient. Periodically poled $LiNbO_3$, for example, can be quasi-phase-matched over the entire transparency range from less than 400 nm to greater than 4000 nm. Furthermore, the crystal orientation can be selected to optimize the nonlinear interaction. PP chips may be operated so as to generate second harmonic radiation (SHG) or sum frequency radiation (SFG).

If periodically-poled (PP) materials are used, an 1-D laser array could be mated to a flat chip of poled material, to produce the desired 1-D array of visible lasers. 2-D arrays could be produced by stacking the 1-D arrays. To produce green, the PP chip would be an SHG chip. To produce red, the PP chip may have OPO and SFG gratings in tandem on the same chip (OPO mirrors could be coated directly onto the chip). To produce blue, the PP chip may have tandem SHG and SFG gratings to produce the third harmonic. The grating period of the PP chips can be chirped across their width, if necessary, to efficiently convert the enhanced bandwidth of the 1-D laser array (although the spectral bandwidth of the PP material may be large enough that this is not necessary).

It may be undesirable to operate periodically-poled materials at elevated temperatures especially if they have to be maintained. In this case, one may want to use for the nonlinear conversion tandem arrangements of room-temperature non-critical phase-matched (NCPM) materials, or walk-off-compensated crystals. Alternatively, discrete crystals may be used that have a suitably "wide" tuning range and are held at sightly different temperatures near room temperature or at different angles. As a result, the optimum phase-matched wavelength for intra-cavity frequency conversion would be slightly different from one laser to the next in the array.

The aforedescribed methods for producing visible RGB laser radiation are known in the art and are nor part of the present invention.

The exemplary compact 2-D bandwidth-enhanced laser array 10 depicted in FIG. 1 can be constructed either from a two-dimensional array of vertical-cavity surface-emitting lasers (VCSEL) or by superposition of 1-D edge emitting laser bars 122, 124, . . . , with each laser bar having multiple laser emitters 101, 102, . . . , 106. VCSEL's tend to have a superior overall efficiency due to their higher beam quality. Edge emitting laser bars can include tens to hundreds of closely spaced emitters formed on the same bar; alternatively, individual laser edge emitters can be laid side-by-side to make the 1-D laser bar. The bars can be quite thin by at least partially removing the substrate on which the laser emitters are grown. The bars can be electrically connected in series, thereby providing a substantially identical optical power emitted by each element. Array bandwidths of 10 nm or more can be achieved by selecting diode emitters with different peak emission wavelengths, as described below. It has be observed that not all the lasing elements need to have different wavelengths from one another, and that wavelength can repeat across the 2-D array as long as the emitters do not strongly interact and provide the desired assembly bandwidth of approximately 1–10 nm.

The emission wavelength of semiconductor diode laser emitters 101, 102, . . . depicted in FIG. 1 may be selected and/or adjusted by one of the following methods: (1) building the 2-D array from stacked 1-D bars, with the wavelength range of each bar selected so as not to coincide with the wavelength of another bar, with the 2-D array covering the desired assembly wavelength range Λ; (2) varying the composition of the active layer across the device structure during crystal growth; (3) varying the thickness and/or composition of the quantum well (QW) layer in a QW structure during crystal growth; (4) varying the spectral response of the end mirrors across the gain curve of the laser (this may also include an etalon with a transmission coefficient that varies across the emitter array 10; and/or (5) non-uniformly heating or cooling the array 10 to introduce temperature gradient and thereby a shift in the bandgap.

Figure 2:
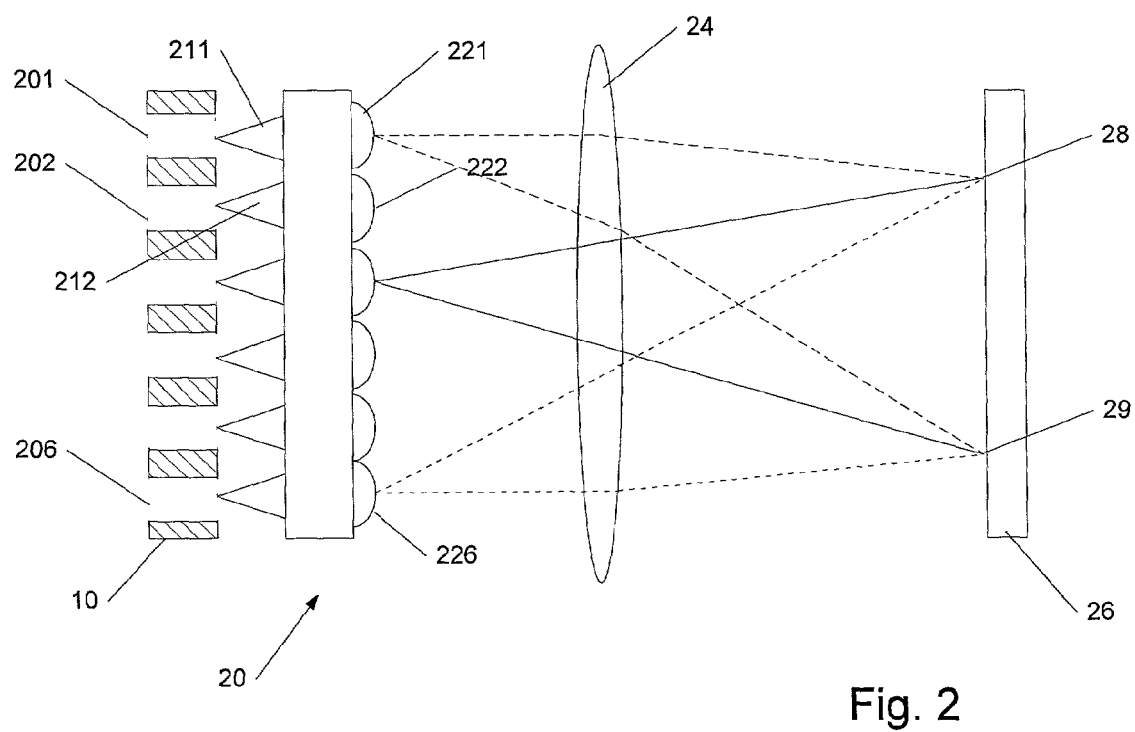
FIG. 2 is a schematic cross-sectional view of a color channel of a projection display incorporating the bandwidth-enhanced laser light source.

FIG. 2 shows a cross-sectional view of a color channel 20 of a projection display.

The color channel 20 includes the bandwidth-enhanced laser light source 10, a two-dimensional microlens array 22, subsequently also referred to as "fly-eye" lens, with lenslets 221, 222, . . . that substantially match the spatial arrangement of the respective lasing elements 201, . . . , 206 of the laser light source 10, a condenser lens 24, and a spatial light modulator 26 which can be in form of a liquid crystal light valve (LCD) or a deformable mirror device (DMD). For example, the lenslet 221 in conjunction with the condenser lens 24 images the laser beam 211 emitted by the respective lasing elements 201 onto the active surface 28, 29 of the spatial light modulator 26. Likewise, the lenslet 222 images the laser beam 212 emitted by the respective lasing elements 202 onto the active surface 28, 29, and so on. As a result, the spectral output of all lasing elements 201, 202, . . . is superpositioned on the active surface 28, 29 of the spatial light modulator 26, forming the desired bandwidth-enhanced laser illumination for a projection display.

The lenslets of the "fly-eye" lens are also designed so as to transform the circular or elliptical beams 211, 212, . . . into a substantially rectangular shape to conform to the size and aspect ratio of the modulator 26. In other words, the "fly-eye" lens array and a condenser lens deliver a uniform-intensity rectangular patch of bandwidth-enhanced light to a modulator in the image plane.

Figure 3:
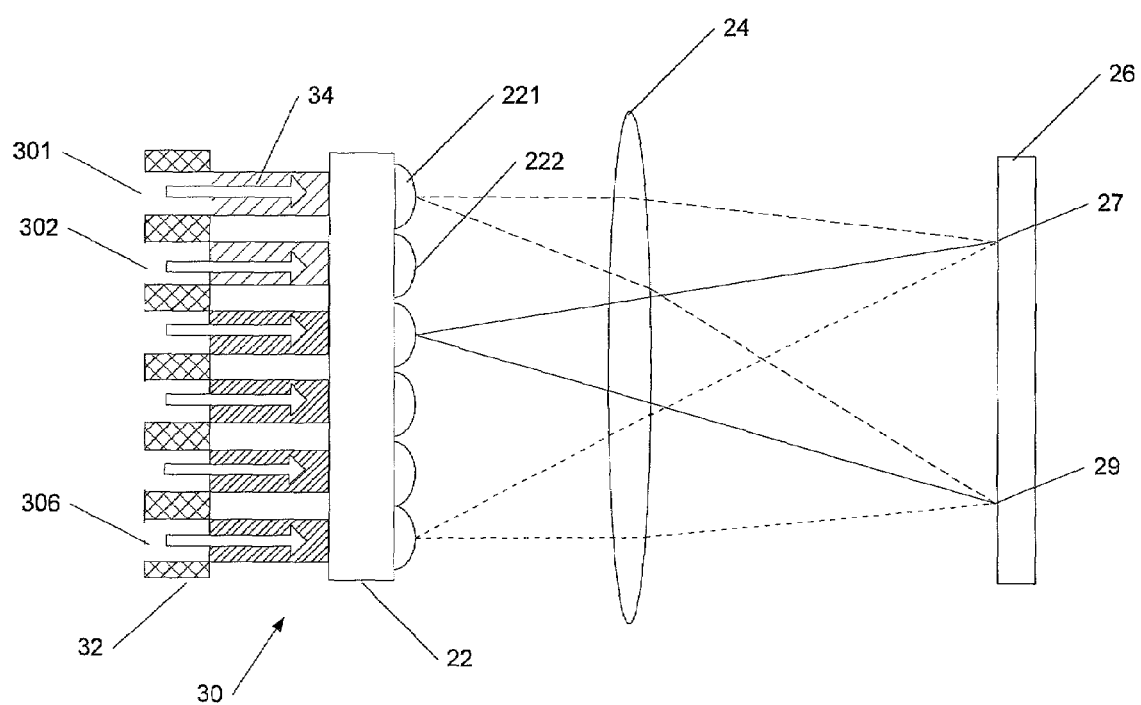
FIG. 3 shows an alternative embodiment of the bandwidth-enhanced laser light source incorporated in a projection display.

FIG. 3 shows a cross-sectional view of an alternative embodiment of a color channel 30 of a projection display. As in the example of FIG. 2, the spectral output of lasing elements 301, 302, . . . is superpositioned on the active surface 28, 29 of the spatial light modulator 26, forming the desired bandwidth-enhanced laser illumination for a projection display. Unlike the embodiment of FIG. 2, however, the light emitting array 32 is assumed to emit light in a spectral range that is not suitable for RGB projection displays, for example, in the IR spectral range. In this case, the IR emitter can be mated, in the illustrated example butt-coupled, to a nonlinear optical element 34 of a type described above (such as OPO, SHG, SFG or a combination thereof) or of another type known in the art. The wavelength of the light exiting the lenslets 221, 222, . . . may be tuned by selecting the wavelength of the individual emitters 301, 302, . . . and/or by tuning the nonlinear conversion modules 34 over the optical bandwidth of the emitters. The emitters 301, 302, . . . could be IR- or UV-emitting semiconductor laser diodes or fiber lasers. Alternatively, the optical elements 34 could also be passive waveguides, such as optical fibers or a face plate, if the emitters 301, 302, . . . emit suitable R, G or B light.

Figure 4:
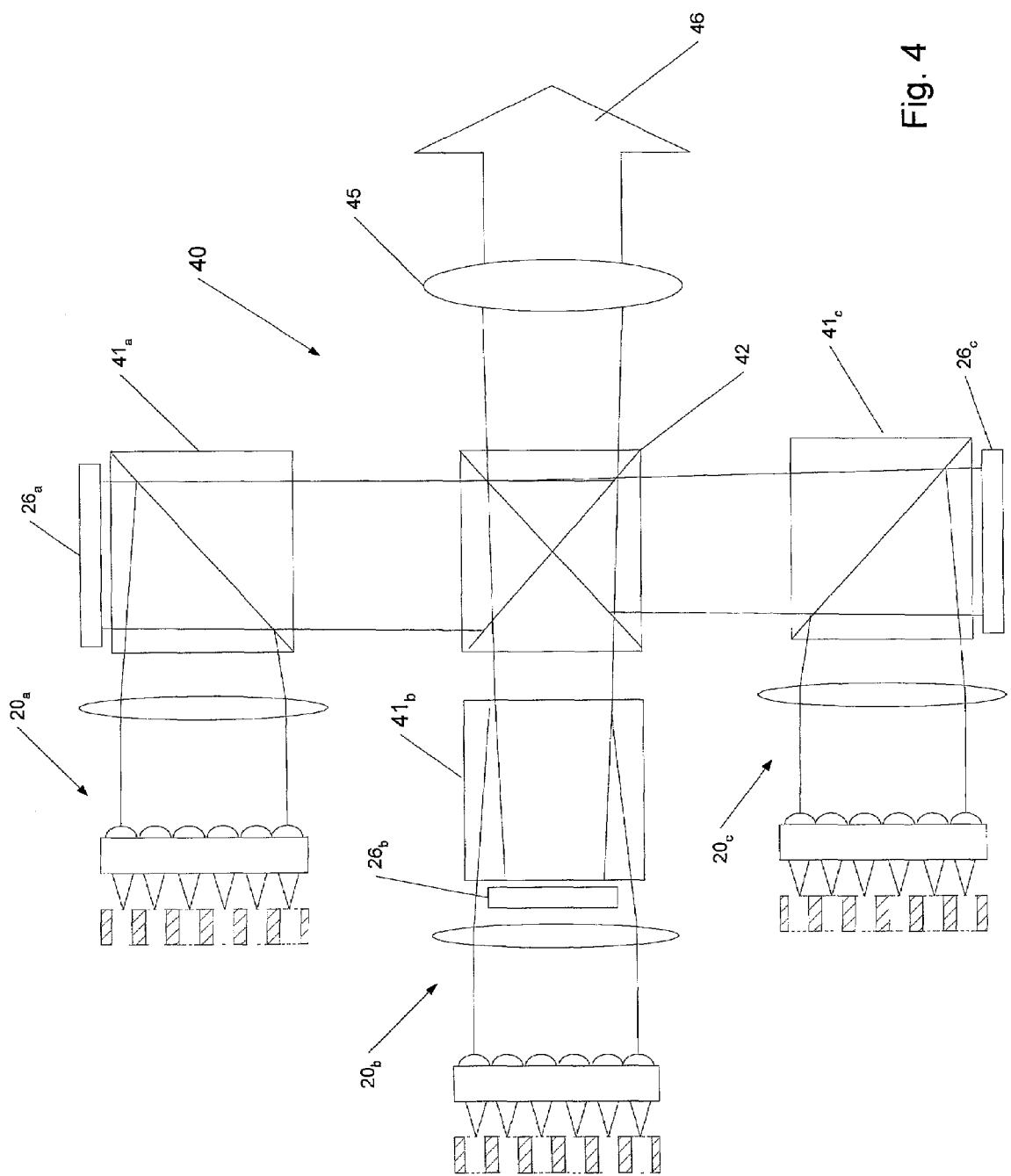
FIG. 4 shows schematically a full color RGB projection display incorporating the bandwidth-enhanced laser light sources in each color channel.

FIG. 4 depicts an exemplary laser image projection system 40 utilizing three light sources $20_a$ (or alternatively $30_a$) of the type described above with reference to FIGS. 2 and 3, respectively. Each of the exemplary light sources $20_a$, $20_b$, $20_c$ in system 40 produces one of the colors R, G, B and includes a beam splitter $41_a$, $41_b$, $41_c$ that directs the light to a respective retro-reflecting LCD $26_a$, $26_b$, $26_c$. The system 40 also includes an X-cube beam combiner 42 that combines the three colors R, G, B into a single modulated RGB beam that passes through a projection lens 45 to be projected on a display screen (not shown).

The critical parameters for designing a bandwidth-enhanced laser array (BELA) 10 include: the number n of emitters in the array, the center wavelength $\lambda_{0i}$ of each emitter, the spectral separation $S_i$ between the center wavelength $\lambda_{0i}$ of an emitter i and the center wavelength $\lambda_{0j}$ of an emitter j being closest in wavelength, the respective bandwidth $\Delta\lambda_i$ of the individual emitters, and the relative output power $A_i$ of each emitter.

Referring now to FIGS. 5–8, a bandwidth-enhanced laser array can be implemented by using, for example, five mutually incoherent emitters of equal amplitude. A mean spectral overlap parameter $\gamma = \overline{\Delta\lambda_i}/\overline{S_i}$ having the values of $\gamma > 1$, $\gamma = 1$, $\gamma < 1$, and $\gamma \ll 1$ can be associated with the ensemble wavelength characteristic of the array.

Figure 5:
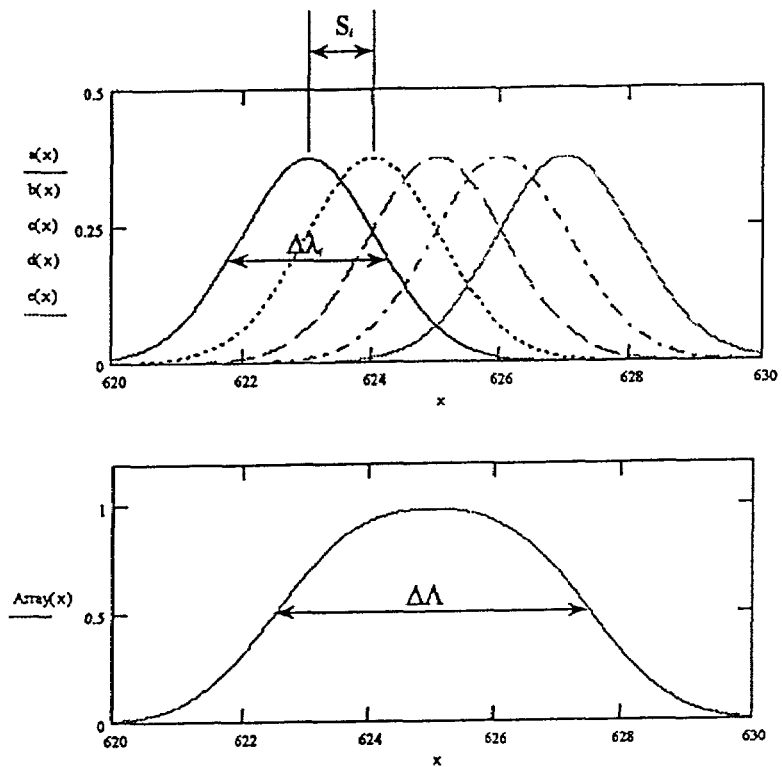
FIG. 5 shows schematically the spectral emission and the ensemble spectrum of five exemplary emitters having a mean spectral overlap parameter $\gamma > 1$.

In a first scenario with $\gamma > 1$, shown in FIG. 5, there exists substantial overlap in the spectra from the individual emitters (top FIG. 5). The resulting ensemble spectrum $\Lambda$ is a smoothly varying function of wavelength and virtually free of any spectral features from the individual emitters (bottom FIG. 5). This condition may be considered "ideal" for bandwidth enhancement since the spectral averaging that occurs produces a uniformly broadened distribution for $\gamma \gg 1$ and large n, thereby minimizing speckle.

Figure 6:
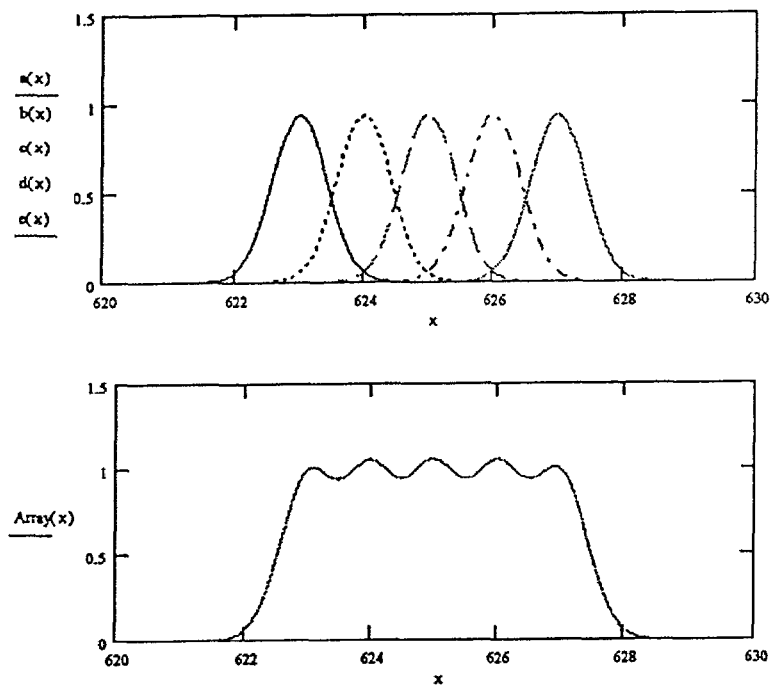
FIG. 6 shows schematically the spectral emission and the ensemble spectrum of five exemplary emitters having a mean spectral overlap parameter $\gamma = 1$.
Figure 7:
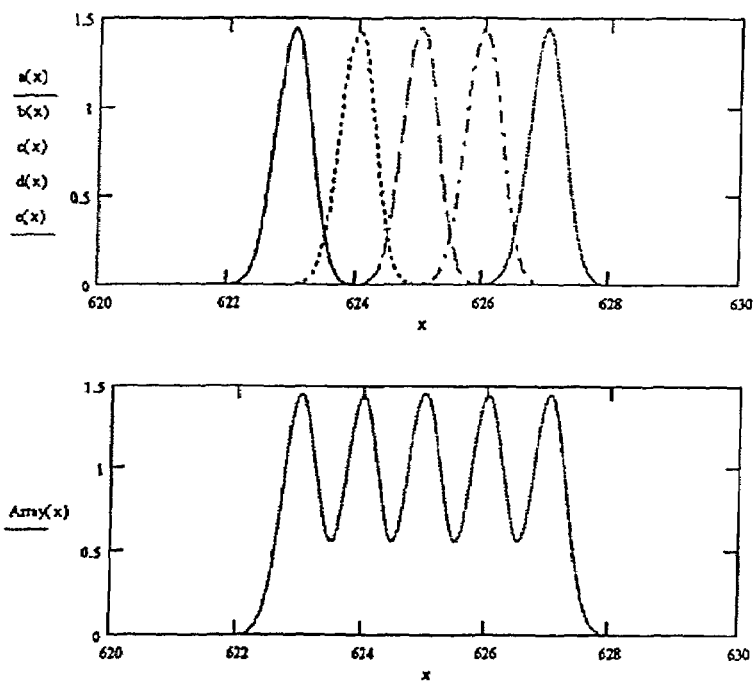
FIG. 7 shows schematically the spectral emission and the ensemble spectrum of five exemplary emitters having a mean spectral overlap parameter $\gamma < 1$.
Figure 8:
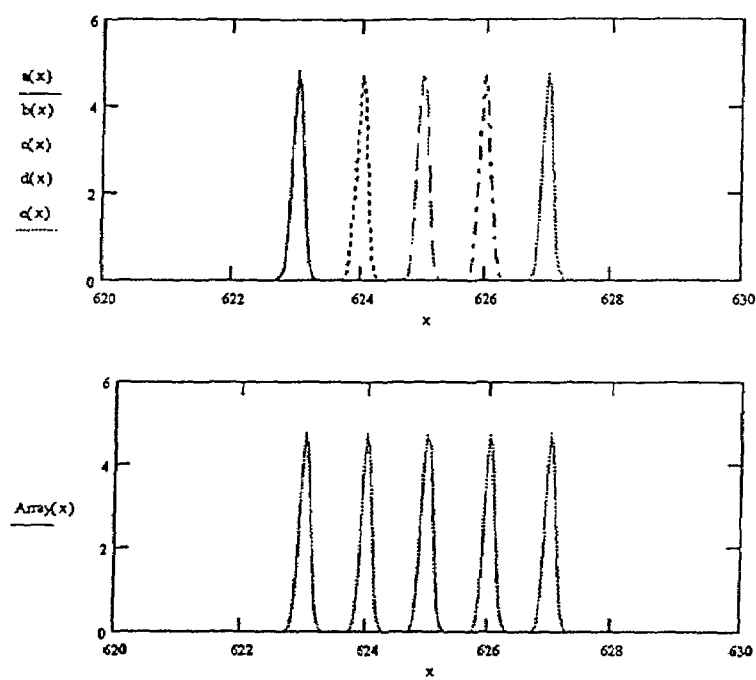
FIG. 8 shows schematically the spectral emission and the ensemble spectrum of five exemplary emitters having a mean spectral overlap parameter $\gamma << 1$.

For $\gamma$ equal to or less than 1, as depicted in FIG. 6 with $\gamma = 1$, FIG. 7 with $\gamma < 1$, and FIG. 8 with $\gamma \ll 1$, the ensemble spectrum $\Lambda$ shown at the bottom of the respective figures becomes a rippled function with local maxima coincident with the central wavelengths $\lambda_{0i}$ of the individual emitters. Values of $\gamma$ less than 1 have been found to be less efficient for reducing speckle than values of $\gamma$ greater than 1. Simulations using Fourier analysis suggest that coherent interference may be even more effectively suppressed with a non-uniform distribution of emitter intensities, with the possibility of eliminating speckle noise altogether.

The light source of the invention has several advantages over the existing technology:

The projector throughput is increased, since the increased spectral bandwidth of the laser array can eliminate speckle directly at the laser source without the need for additional de-speckling optics or techniques that tend to reduce efficiency and polarization. This is particularly beneficial when used in combination with p-Si LCD and LCoS imagers so that a high (efficiency*contrast) product can be realized. This is expected to increase projector throughput by 50% to 100%, thereby delivering up to 10 lumens to the screen per watt of input power.

The system's reliability, as expressed in its mean-time-between-failure (MTBF), can be improved by operating a larger number of array elements at less than their maximum rated output power, while still providing the cumulative RGB power required for the application. Accordingly, laser arrays are expected, over time, to exhibit an inherently slower rate of degradation than a single, high-power laser.

An illuminator based on 1- or 2-D arrays of emitters is scalable by definition and can satisfy a broad range of projector types—from ultra-portable to large venue. Convenient power scaling is accomplished by simply engineering the number and/or power of the individual emitters used in the array. The key for making compact 2-D arrays is to make the 1-D arrays as compact, and thin, as possible. 1-D arrays would stack one on top of the other to configure a square or rectangular 2-D array of emitters. The illuminator is easily manufacturable and fully compatible with the major imaging platforms used in today's projection display products. While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A bandwidth-enhanced laser imaging system comprising:
   a plurality of lasing elements, each lasing element emitting a laser beam with a center wavelength $\lambda_{0i}$ and a spectral bandwidth $\Delta\lambda_i$, wherein the center wavelength of at least one of the lasing elements is wavelength-shifted with respect to the center wavelength of at least one other lasing element, and
   imaging optics that combines the respective laser beams, wherein said combined laser beams have an ensemble spectrum $\Lambda$ with an overlap parameter $\gamma = \overline{\Delta\lambda_i}/\overline{S_i}$, with $\overline{\Delta\lambda_i}$ being a mean spectral bandwidth of the lasing elements and $\overline{S_i}$ being a mean wavelength shift between the center wavelengths $\lambda_{0i}$ of the at least one and the at least one other lasing elements, with $\overline{\Delta\lambda_i}$ and $\overline{S_i}$ being selected so that $\gamma \geq 1$.

2. The system of claim 1, further comprising a modulator illuminated with the combined laser beams and receiving image control signals to form a projected laser image.

3. The system of claim 2, wherein the value of $\gamma$ is selected so as to reduce speckle in the projected laser image.

4. The system of claim 1, wherein the lasing elements are semiconductor lasers that are arranged in a common emission plane.

5. The system of claim 1, wherein the lasing elements form a two-dimensional array.

6. The system of claim 1, wherein the ensemble spectrum $\Lambda$ has an ensemble bandwidth $\Delta\Lambda$ between 1 nm and 10 nm.

7. The system of claim 1, wherein the lasing elements emit a primary color selected from the group consisting of R, G and B.

8. The system of claim 1, wherein the lasing elements emit optical radiation in the UV or IR spectral range, the system further comprising an optical frequency converter pumped by the lasing elements.

9. The system of claim 1, wherein the lasing elements are selected from the group consisting of semiconductor diode lasers, optically-pumped lasers and fiber lasers.

10. The system of claim 8, wherein the optical frequency converter comprises at least one element selected from the group consisting of OPO, SHG, SFG, periodically-poled and quasi-phase-matched nonlinear optical structures.

11. The system of claim 1, wherein the imaging optics comprises an integrating lens and a condenser lens, thereby providing substantially uniform illumination of the common image area.

12. The system of claim 11, wherein the integrating lens is a fly-eye lens.

13. An illuminator for laser projection imaging with reduced speckle, comprising:
  a plurality of lasing elements, with each lasing element defining a laser beam with a center wavelength $\lambda_{0i}$ and a spectral bandwidth $\Delta\lambda_i$, and
  a beam homogenizer that images the laser beams of the plurality of lasing elements on a common imaging surface,
  wherein the imaged laser beams define an ensemble spectrum $\Lambda$ having a spectral overlap parameter $\gamma = \overline{\Delta\lambda_i}/\overline{S_i} \geq 1$, with $\overline{\Delta\lambda_i}$ being a mean spectral bandwidth of the lasing elements and $\overline{S_i}$ being a mean spectral separation between the center wavelengths $\lambda_{0i}$.

14. A bandwidth-enhanced RGB laser projection system with reduced speckle, comprising:
  three illuminators associated with a respective R, G and B channel and producing R, G and B illumination,
  a beam combiner for combining the R, G and B illumination, and
  projection optics for projecting the combined R, G and B illumination on a projection display,
  wherein at least one of the R, G, and B illuminators comprises a plurality of lasing elements, each lasing element emitting a laser beam with a center wavelength $\lambda_{0i}$ and a spectral bandwidth $\Delta\lambda_i$, wherein the center wavelength of at least one of the lasing elements is wavelength-shifted with respect to the center wavelength of at least one other lasing element, and
  imaging optics that combines the respective laser beams to form the R, G or B illumination,
  wherein said combined laser beams have an ensemble spectrum $\Lambda$ with an overlap parameter $\gamma = \overline{\Delta\lambda_i}/\overline{S_i}$, with $\overline{\Delta\lambda_i}$ being a mean spectral bandwidth of the lasing elements and $\overline{S_i}$ being a mean wavelength shift between the center wavelengths $\lambda_{0i}$ of the at least one and the at least one other lasing elements, with $\overline{\Delta\lambda_i}$ and $\overline{S_i}$ being selected so that $\gamma \geq 1$.

15. The RGB laser projection system of claim 14, further comprising respective modulators, wherein each modulator is illuminated with one of the R, G and B illumination and responsive to image control signals corresponding to the respective R, G or B channel, said image control signals modulating the R, G or B illumination, and the projection optics projecting the modulated R, G and B illumination on the projection display to form a projected laser image with reduced speckle.

16. A method of producing bandwidth-enhanced laser radiation, comprising:
  producing a plurality of laser beams, each laser beam having a center wavelength $\lambda_{0i}$ and a spectral bandwidth $\Delta\lambda_i$, wherein the center wavelength of at least one of the laser beams is wavelength-shifted with respect to the center wavelength of at least one other laser beam, and
  combining the respective laser beams into a spatially overlapping beam,
  wherein the spatially overlapping beam has an ensemble spectrum $\Lambda$ with an overlap parameter $\gamma = \overline{\Delta\lambda_i}/\overline{S_i}$, with $\overline{\Delta\lambda_i}$ being a mean spectral bandwidth of the laser beams and $\overline{S_i}$ being a mean wavelength shift between the center wavelengths $\lambda_{0i}$ of the at least one and the at least one other laser beams, with $\overline{\Delta\lambda_i}$ and $\overline{S_i}$ being selected so that $\gamma \geq 1$.

* * * * *